(12) United States Patent
Kawakami

(10) Patent No.: US 8,114,286 B2
(45) Date of Patent: Feb. 14, 2012

(54) WATER TREATMENT DEVICE

(76) Inventor: Yoichi Kawakami, Hamamatsu (JP)

( * ) Notice: Subject to any disclaimer, the term of this patent is extended or adjusted under 35 U.S.C. 154(b) by 333 days.

(21) Appl. No.: 12/342,441

(22) Filed: Dec. 23, 2008

(65) Prior Publication Data

US 2009/0173686 A1    Jul. 9, 2009

Related U.S. Application Data

(63) Continuation-in-part of application No. PCT/JP2006/313453, filed on Jun. 29, 2006.

(51) Int. Cl.
*C02F 1/00* (2006.01)
*C02F 9/00* (2006.01)
*B01D 15/00* (2006.01)
*B01D 61/00* (2006.01)

(52) U.S. Cl. .............. 210/257.2; 210/261; 210/263; 210/652

(58) Field of Classification Search ........... 210/257.2, 210/261–263, 652, 90, 97, 134, 195.2
See application file for complete search history.

(56) References Cited

U.S. PATENT DOCUMENTS

| | | | | |
|---|---|---|---|---|
| 4,110,219 A * | 8/1978 | Maples | ............. | 210/245 |
| 4,997,553 A * | 3/1991 | Clack | ............. | 210/97 |
| 5,078,864 A * | 1/1992 | Whittier | ............. | 210/137 |
| 5,296,148 A * | 3/1994 | Colangelo et al. | ............. | 210/642 |
| 5,358,635 A * | 10/1994 | Frank et al. | ............. | 210/90 |
| 5,445,729 A * | 8/1995 | Monroe et al. | ............. | 210/86 |
| 5,454,944 A * | 10/1995 | Clack | ............. | 210/257.1 |
| 5,658,457 A * | 8/1997 | Schoenmeyr | ............. | 210/97 |
| 5,976,363 A * | 11/1999 | Monroe et al. | ............. | 210/90 |
| 6,110,375 A * | 8/2000 | Bacchus et al. | ............. | 210/652 |
| 7,101,480 B2 * | 9/2006 | Carlotto | ............. | 210/232 |
| 7,550,084 B2 * | 6/2009 | Schmitt | ............. | 210/257.2 |
| 7,862,710 B2 * | 1/2011 | Kloos et al. | ............. | 210/87 |

* cited by examiner

*Primary Examiner* — Ana Fortuna
(74) *Attorney, Agent, or Firm* — Sughrue Mion, PLLC

(57) ABSTRACT

Prior water treatment equipments have several water clarifying process filters, water purifier and water reservoir separated from each other, occupying too much space to install under a water tank and resulting inconvenient installment. The water treatment equipments for home cannot be received in water tanks, and thus water clarifier and water purifier are disposed in the water tanks while the water reservoir is disposed separately. Water pipes are connected in between. Therefore, water clarifying processors, water reservoir and water purifier utilizing RO membrane may be integrated to eliminate unnecessary space in existing systems.

3 Claims, 15 Drawing Sheets

WATER TREATMENT DEVICE

TECHNICAL FIELD

The invention relates to a reverse osmosis (RO) water purifying equipment.

BACKGROUND OF THE INVENTION

A reverse osmosis (RO) water purifier (hereafter referred to as a water purifier) used at home performs water clarifying through 3 filters, including a preprocessing filter membrane, an activated carbon filter and a micron filter membrane. Then purified water is produced by the water purifier and stored into a water reservoir disposed independently.

Since these three water clarifying process filters, the water purifier and the water reservoir are separated from each other, this equipment has a deficiency of occupying too much space to install under a water tank.

SUMMARY OF THE INVENTION

Issues to Solve

A preprocessing filter membrane, an activated carbon filter and a micron filter membrane needed for water clarifying are separated in order for filter exchanging;

The water reservoir is disposed separately in a certain corner of kitchen because the water reservoir cannot be received in the water tank. A water pipe is connected in between.

Means for Solving Issues

Water clarifying processors, water reservoir and water purifier utilizing RO membrane for purified water acquisition are integrated to eliminate unnecessary space in existing systems.

Effects of the Invention

The water treatment equipment of the invention incorporates existing three water clarifying processors, one water reservoir and one water purifier, thereby reducing displacement space and expense.

Figure 1:
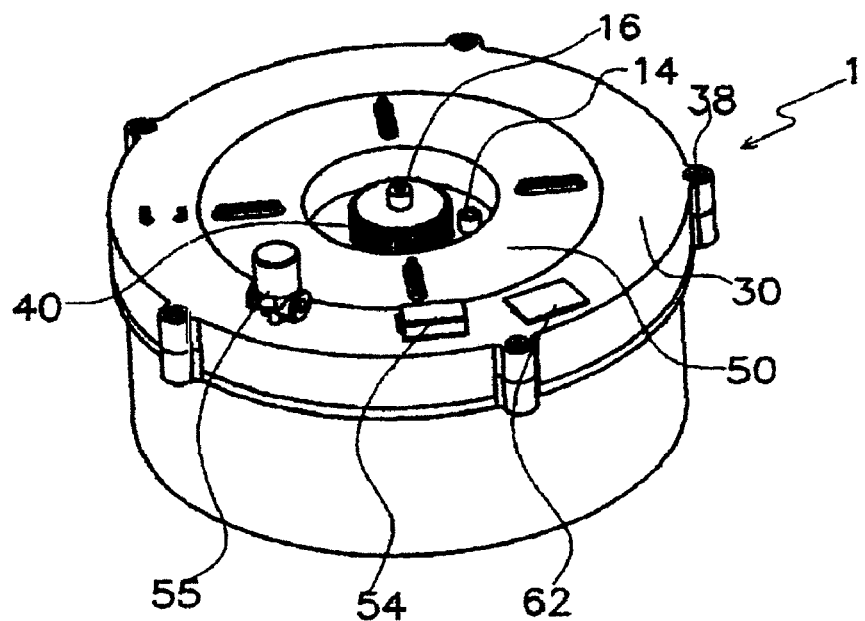
FIG. 1 is a schematic view of appearance of a water treatment equipment in accordance with the invention.

DESCRIPTION OF SYMBOL 1 water treatment equipment of the invention
2 water supply pipe
3 manifold spigot
4 purified water outlet spigot
5 clarified water outlet spigot
6 water intake
7 water pipe (ex.: hose)
8 purified water outlet
9 clarified water outlet
10 water clarifier
11 filter cartridge
12 pressure reservoir (water reservoir)
13 water clarifier inlet
14 water clarifier outlet
15 water purifier
16 clarified water intake of water purifier
17 water purifier outlet 18 membrane-cleaning water outlet
19 water discharge outlet
20 miscellaneous water outlet
21 outlet adjusting knob
22 outlet and inlet of pressure reservoir
23 ro membrane cartridge of water purifier
24 purified water pipe through membrane center
25 preprocessing filter membrane
26 activated carbon layer
27 micron filter membrane
28 cartridge base
29 cartridge cap
30 body cover
31 sealing padding
32 sealing o-ring
33 body
34 cylinder of water purifier
35 clarified water connecting section
36 air space
37 sealing padding
38 fixed pin
39 raw water tank within water clarifier
40 water purifier cap
41 upper section of water reservoir
42 sealing element
43 attaching material for filter membrane
44 water clarifier barrel
45 inner section of water purifier
46 manifold pipe
47 stopcock in body wall
48 water outlet at exit of water clarifier
49 clarified water intake
50 water clarifier cap (perforated in the middle for water purifier cap)
51 water clarifier cap
52 water pipeline
53 pressure sensor
54 electronic computer
55 solenoid valve
56 floater with built-in magnet
57 liquid level switch a
58 magnet of floater
59 liquid level switch b
60 exit of water clarifier
61 clarified water intake of water purifier
62 battery
63 wire
64 pipeline opening
65 water purifier and clarifier cap
66 a pot or bottle for taking purified water

DETAILED DESCRIPTION OF THE INVENTION

A water treatment equipment implemented by the invention has a circular or box shape, in which water introduced by water supply pipe (hereafter referred to as raw water) is firstly clarified and then purified. At the bottom of water reservoir body with purified water outlet and inlet filling and draining purified water, a cylinder of water clarifier and a cylinder of water purifier are provided. The cylinder of water clarifier has an inlet at the intake side of water clarifier, while within the cylinder of water clarifier the cylinder of water purifier has a purified water outlet and a membrane-clarified water outlet. A clarified water processing cartridge is mounted in the cylinder of water clarifier and a water outlet at the exit side of water clarifier is disposed on the top of the cylinder. A water clarifier cap with space for a water purifier cap covers the cylinder of water clarifier with padding interposed so as to form a water clarifier. A reverse osmosis (RO) membrane processing cartridge is mounted in the cylinder of water purifier. A water purifier cap with a clarified water intake receiving clarified water covers the cylinder of water purifier with padding interposed so as to form a water purifier. At the portion of the body excluding said water purifier and said water clarifier, a body cover is fixed and sealed by a fixed pin or other means with padding interposed to form a water reservoir. Raw water is taken from water intake at water purifier inlet side utilizing water pipes such as hose (hereafter referred to as water pipe), then is dispensed from water outlet at exit of water clarifier after clarification, and then is conveyed into the clarified water intake of the water purifier for receiving clarified water through a water pipe for purification in the water purifier. Purified water is dispensed from purified water outlet, and then conveyed into purified water outlet and inlet of water reservoir through a water pipe. The water is stored in the pressure water reservoir with pressure of raw water, and air in the upper section of pressure water reservoir sustains the pressure. When the purified water outlet spigot is opened, purified water is dispensed automatically with the sustained pressure. Membrane-cleaning water, which cleans the surface of RO membrane when producing purified water, is discharged from membrane-cleaning water outlet through a water pipe. Said water clarifier, said water purifier and said pressure water reservoir are formed integrally.

Embodiment 1

The first embodiment of this invention with water clarifier 10, water purifier 15 and pressure water reservoir 12 integrated is described below referring to FIG. 1 to FIG. 10.

Figure 2:
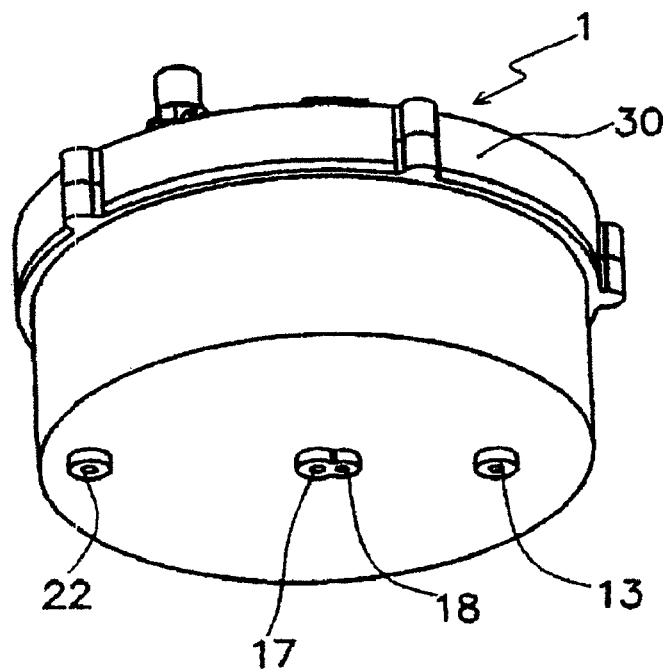
FIG. 2 is a schematic view of appearance of a water treatment equipment in accordance with the invention.
Figure 3:
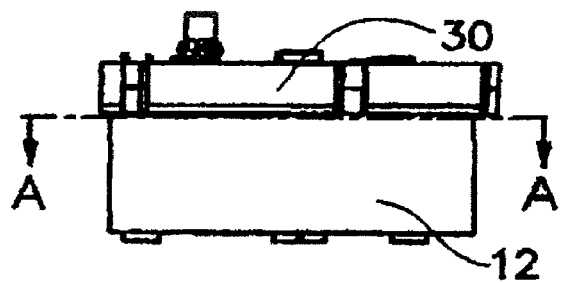
FIG. 3 is a front view of a water treatment equipment in accordance with the invention.
Figure 4:
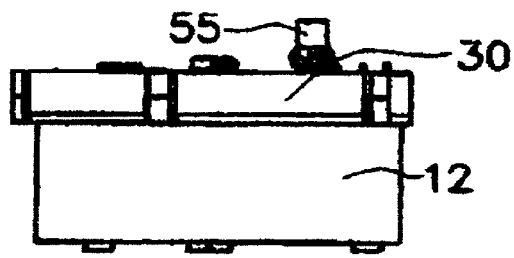
FIG. 4 is a back view of a water treatment equipment in accordance with the invention.
Figure 5:
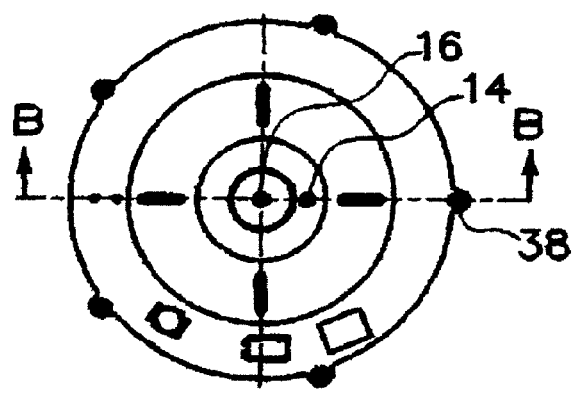
FIG. 5 is a top view of a water treatment equipment in accordance with the invention.
Figure 6:
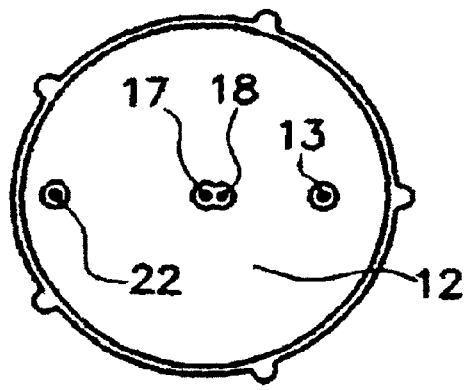
FIG. 6 is a bottom view of a water treatment equipment in accordance with the invention.
Figure 7:
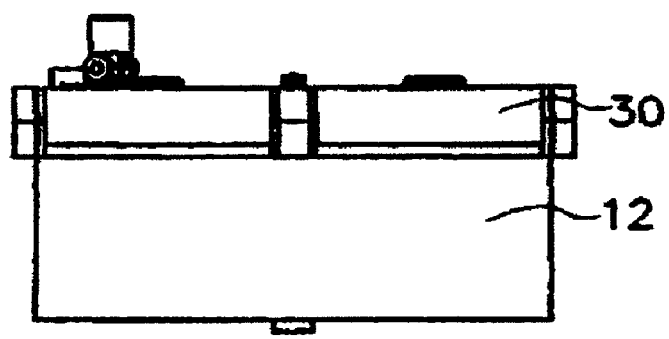
FIG. 7 is a right view of a water treatment equipment in accordance with the invention.
Figure 8:
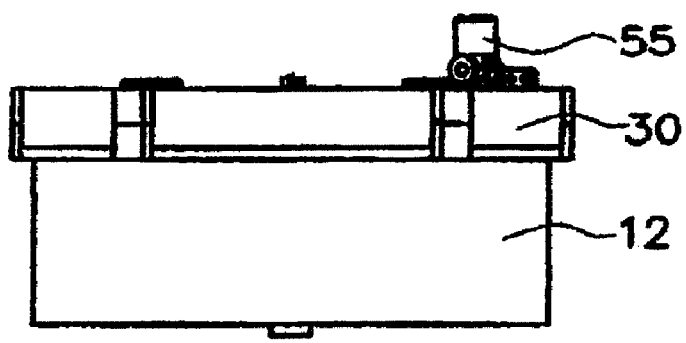
FIG. 8 is a left view of a water treatment equipment in accordance with the invention.
Figure 9:
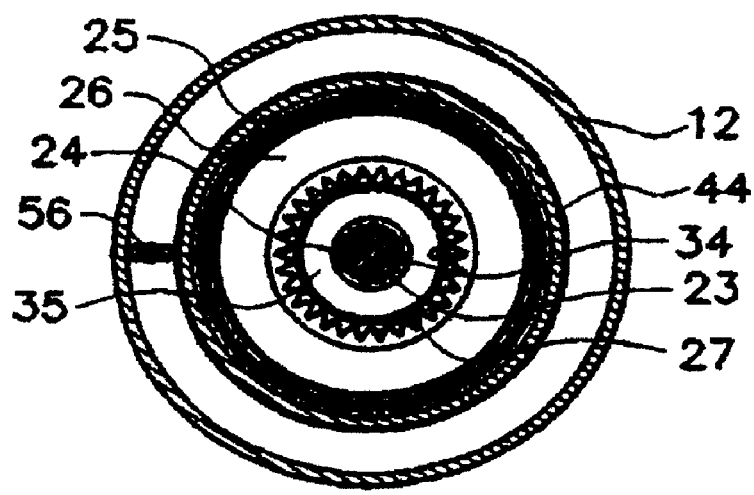
FIG. 9 is a sectional view of FIG. 3 along line A-A.
Figure 10:
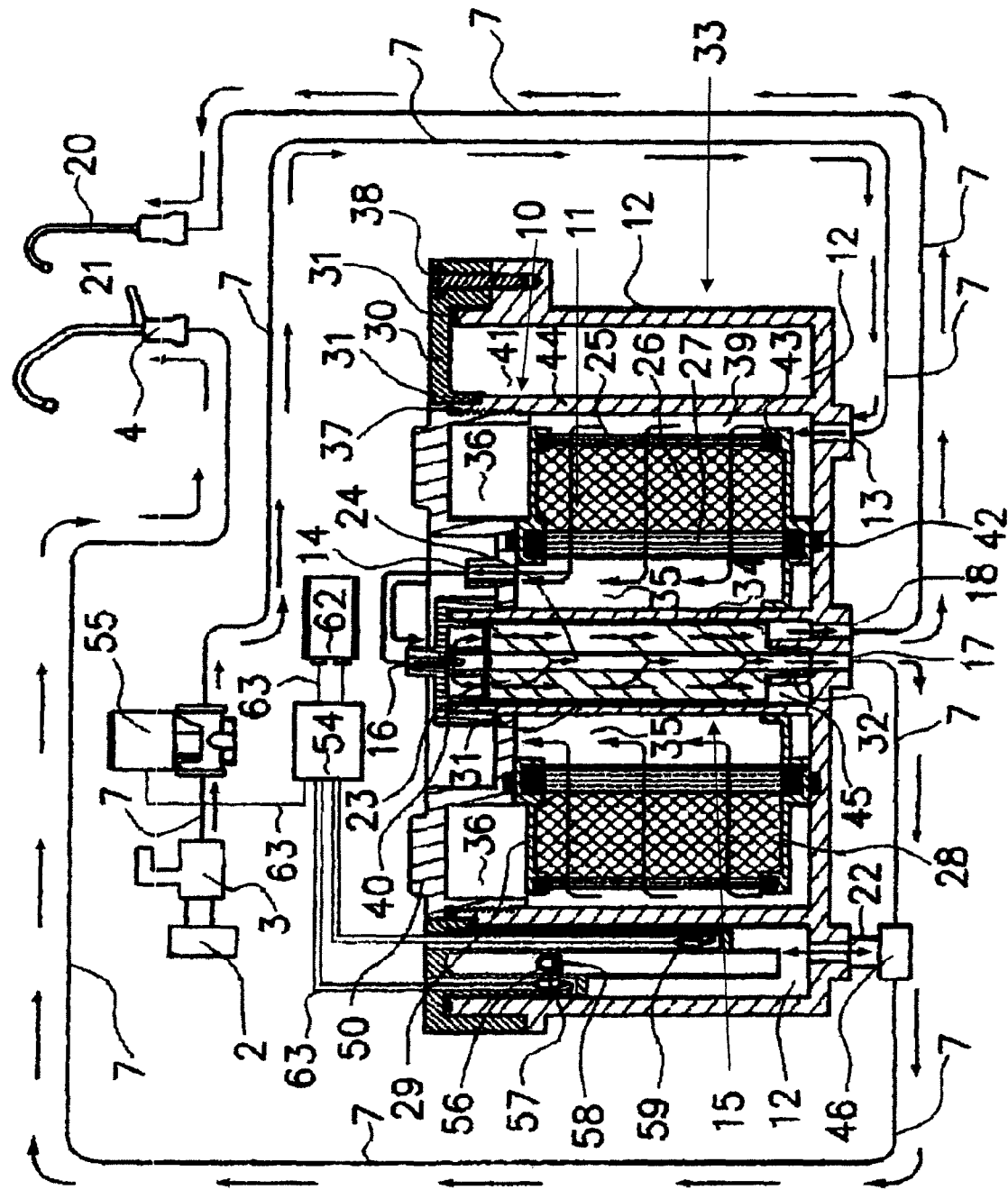
FIG. 10 is a sectional view of FIG. 5 along line B-B.

FIG. 1 and FIG. 2 are schematic views of appearance of a water treatment equipment in accordance with the invention. FIG. 3 is a front view. FIG. 4 is a back view. FIG. 5 is a top view. FIG. 6 is a bottom view. FIG. 7 is a right view. FIG. 8 is a left view. FIG. 9 is a sectional view of FIG. 3 along line A-A. FIG. 10 is a sectional view of FIG. 5 along line B-B.

The flowing direction of water when producing purified water is described below with FIG. 10 illustrating the flowing direction of water with arrow referring to connecting water pipe 7.

Reference number 41 of FIG. 10 refers to an upper section of pressure water reservoir 12 (hereafter referred to as water reservoir). Pressure sustaining air section is formed with the function of pressure infused water with purified water produced by raw water pressure. Purified water is dispensed automatically under the sustained pressure with purified water outlet spigot 4.

Fixed pin 38 is a pin connected water reservoir 12 and main body cap 30 fixedly.

Water introduced from water supplying pipe 2 by manifold spigot 3 flows into raw water tank 39 within water clarifier from purified water inlet 13 through water pipe 7. Impurity and solid matter in water is filtered out by a preprocessing filter membrane 25 formed between cartridge base 28 and cartridge cap 29 by means of cross-flow filtering. Then, organic matter is absorbed and filtered by activated carbon layer 26. Solid matter above order of micron is then filtered by micron filter membrane 27. After that, water flows toward clarified water connecting section 35 and is discharged from water clarifier outlet 14.

One part of purified water introduced from clarified water Intake 16 of water purifier by water pipe 7 is filtered into purified water in RO membrane cartridge 23 of water purifier. Purified water is collected into purified water pipe 24 through membrane center and then dispensed from water purifier outlet 17. The other part cleans the surface of RO membrane. Membrane-cleaning water is discharged from membrane-cleaning water outlet 18 through water pipe 7 to miscellaneous water outlet 20.

Purified water dispensed from outlet 17 of water purifier, is either stored into water reservoir marked as 12 through manifold pipe 46 by water pipe 7, or dispensed from purified water outlet spigot 4 through manifold pipe 46 by water pipe 7.

Reference number 41 of FIG. 10 refers to an upper air section to reduce its volume according pressure so as to sustain pressure.

When purified water is produced with RO membrane, purified water is stored in water reservoir 12 and a floater 56 with built-in magnet floats with the level of water reservoir 12. When the level inside water reservoir 12 raises to a certain height, liquid level switch a57 instructs computer 54 to turn off solenoid valve 55 for stopping water supplying as a response through magnet 58 of the floater. Vice versa, liquid level switch A57 instructs computer 54 to turn on solenoid valve 55 for resuming purified water supplying as a response of lowering magnet 58 of the floater with the liquid level.

Reference number 36 of FIG. 10 refers to an upper air section of water clarifier to alleviate impulsion on water clarifier.

Figure 11:
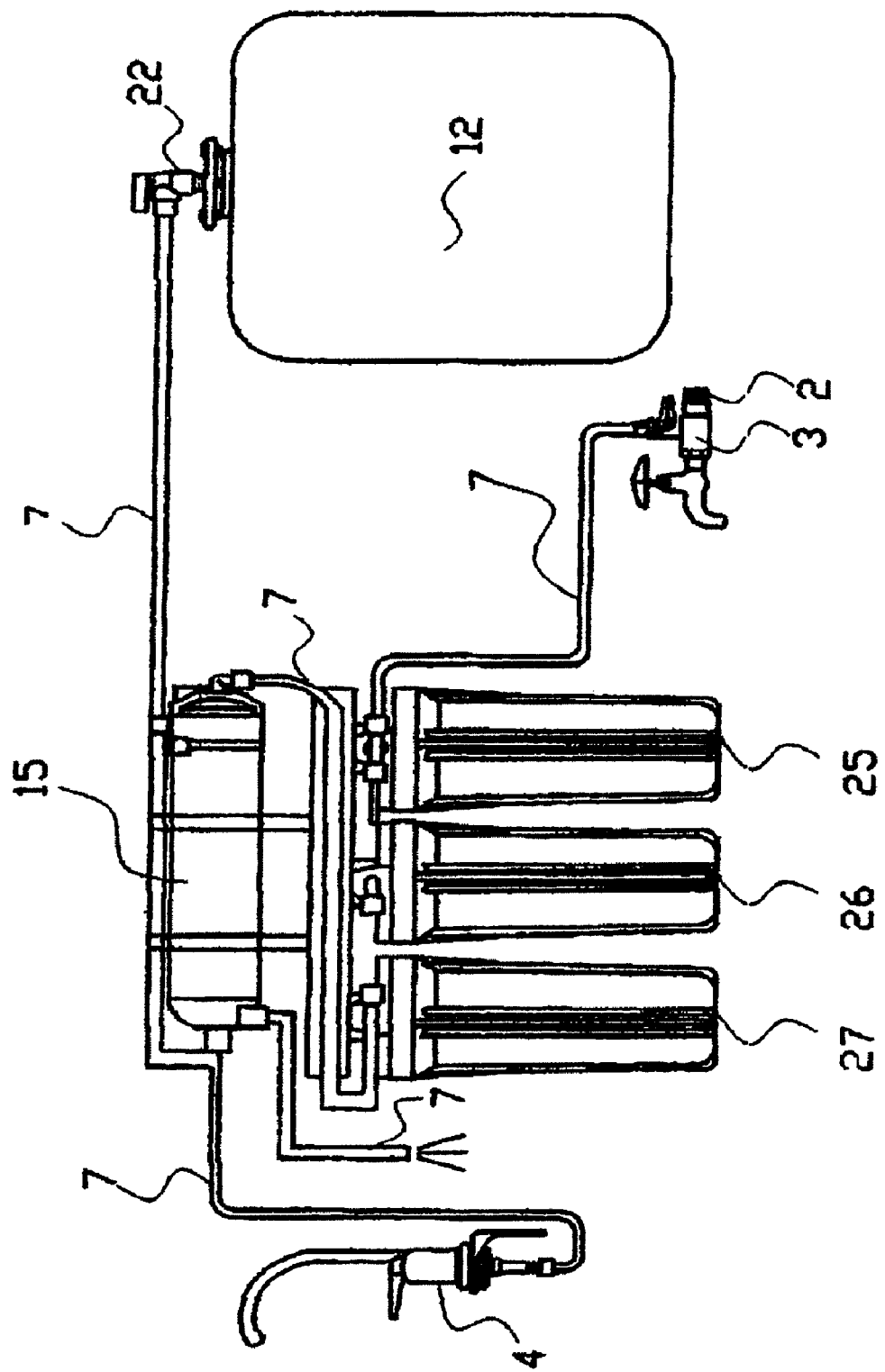
FIG. 11 is an overview of prior art water purifying equipment.
Figure 12:
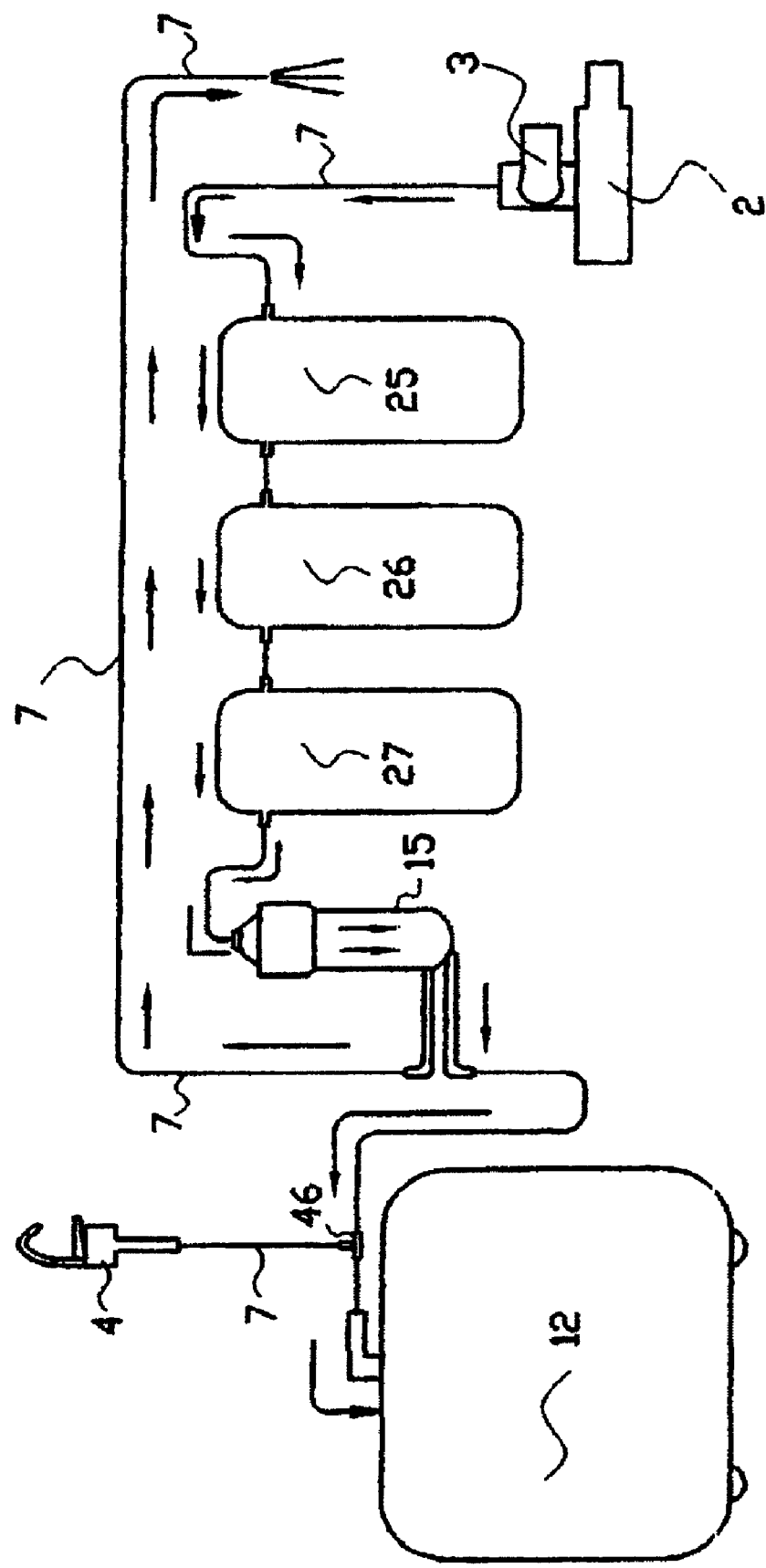
FIG. 12 is an overview of prior art water purifying equipment.

FIG. 11 and FIG. 12 illustrate prior art water purifying devices. Reference number 25 is a preprocessing filter membrane built-in filter, 26 is an activated carbon built-in filter, 27 is a water clarifying filter with micron filter membrane built in, 15 is a water purifier, 12 is a pressure water reservoir. Having a form with the above 5 devices separated, a larger disposing space is required and waste water from water purifier is discharged from the top of water pipe 7.

Embodiment 2

The second embodiment of this invention is described below referring to FIG. 13 to FIG. 24. In the water treatment equipment of this embodiment, water clarifier inlet 13, outlet of water purifier 17 and membrane-cleaning water outlet 18 are respectively connected to individual water pipeline 52 disposed in the wall or at the bottom of pressure water reservoir 12.

Figure 13:
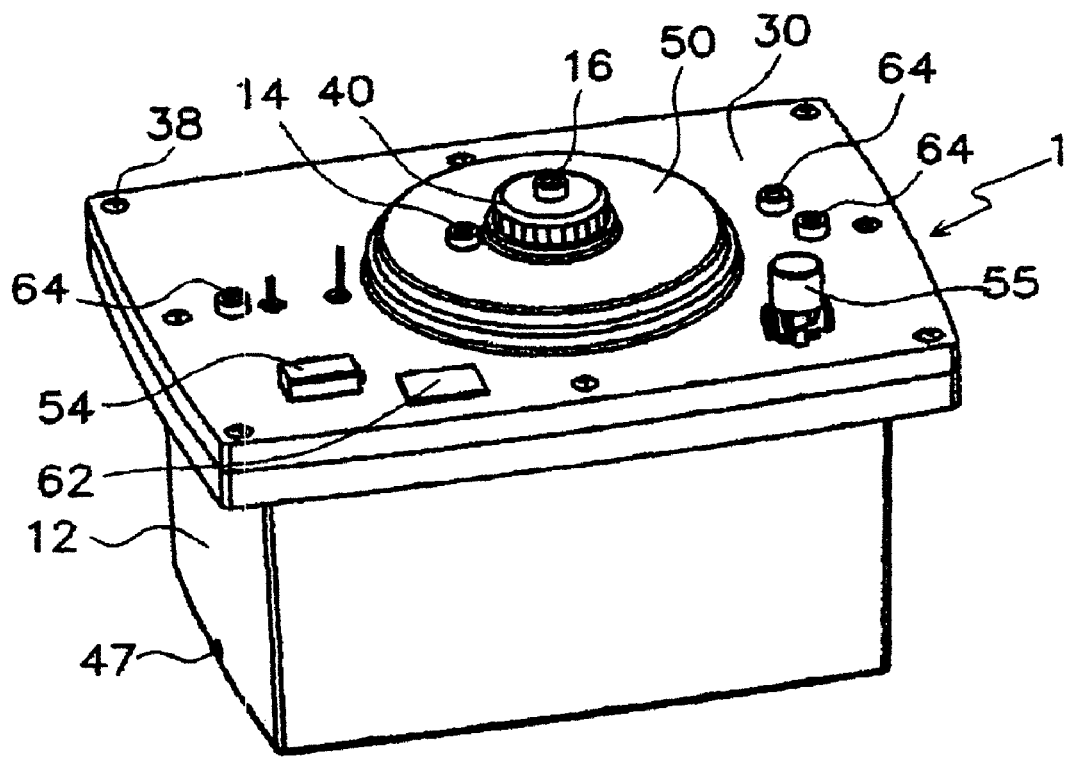
FIG. 13 is a schematic view of appearance of a water treatment equipment in accordance with a second embodiment of the invention.
Figure 14:
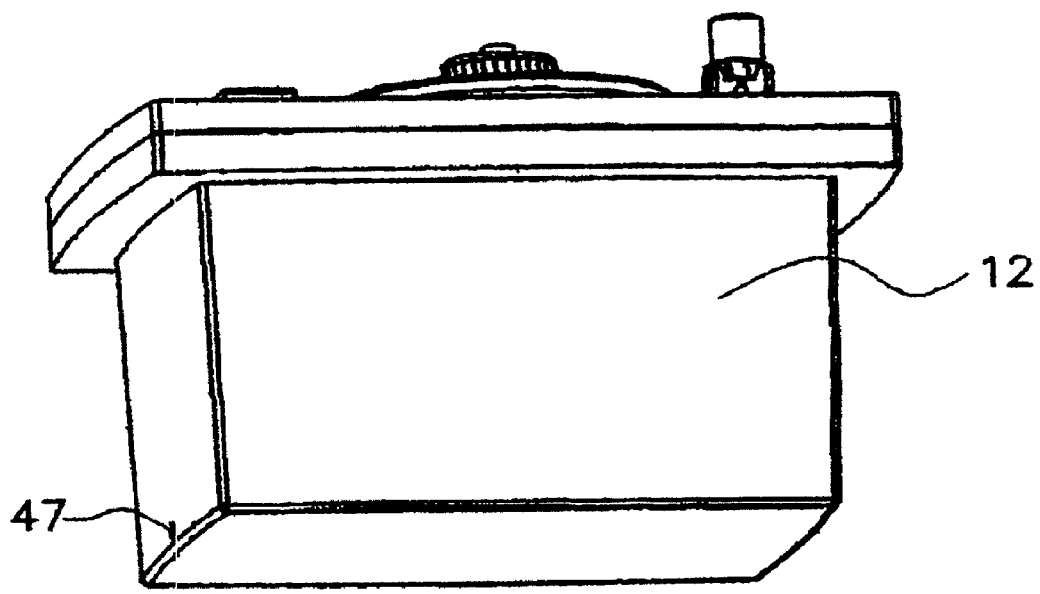
FIG. 14 is a schematic view of appearance of a water treatment equipment in accordance with a second embodiment of the invention.
Figure 15:
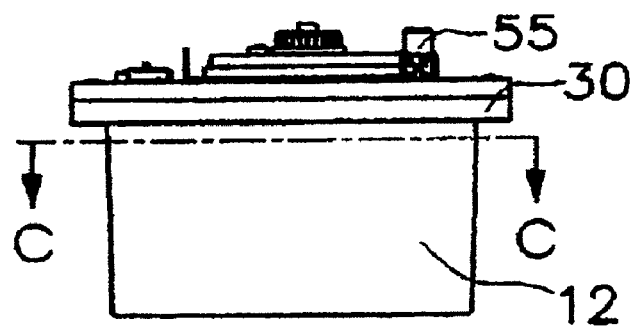
FIG. 15 is a front view of a water treatment equipment in accordance with a second embodiment of the invention.
Figure 16:
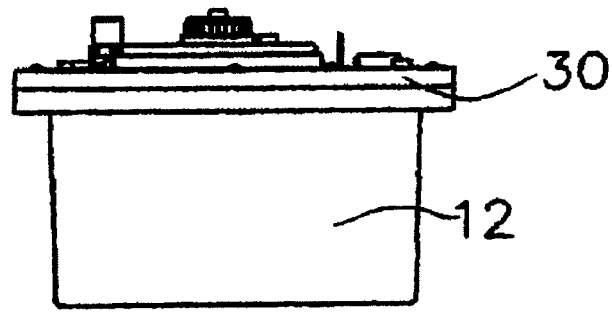
FIG. 16 is a back view of a water treatment equipment in accordance with a second embodiment of the invention.
Figure 17:
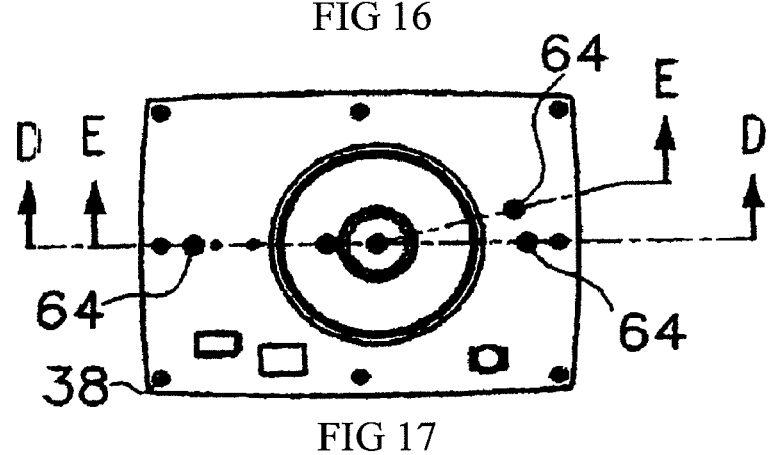
FIG. 17 is a top view of a water treatment equipment in accordance with a second embodiment of the invention.
Figure 18:
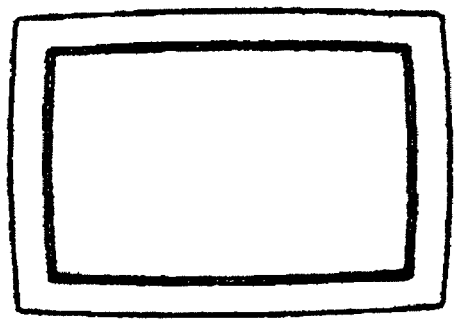
FIG. 18 is a bottom view of a water treatment equipment in accordance with a second embodiment of the invention.
Figure 19:
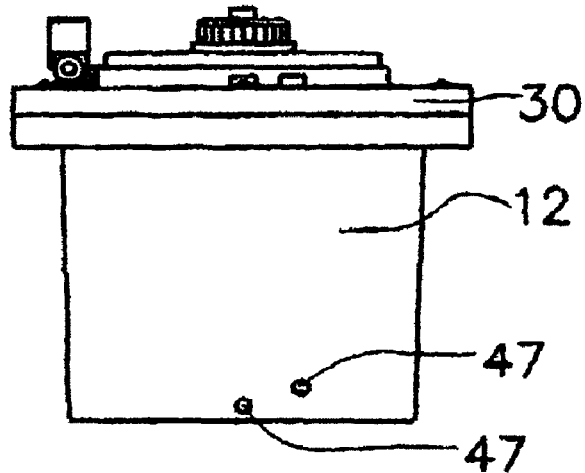
FIG. 19 is a right view of a water treatment equipment in accordance with a second embodiment of the invention.
Figure 20:
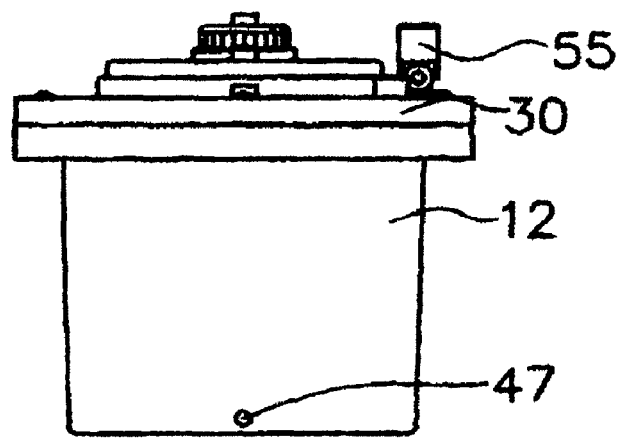
FIG. 20 is a left view of a water treatment equipment in accordance with a second embodiment of the invention.
Figure 21:
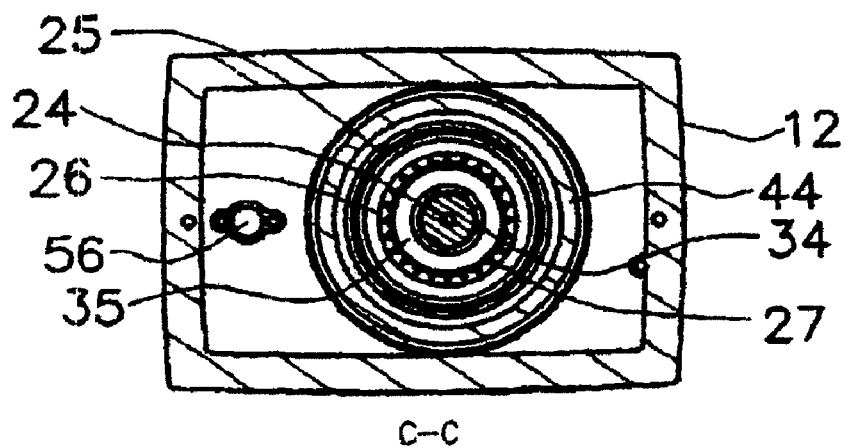
FIG. 21 is a sectional view of FIG. 15 along line C-C.
Figure 22:
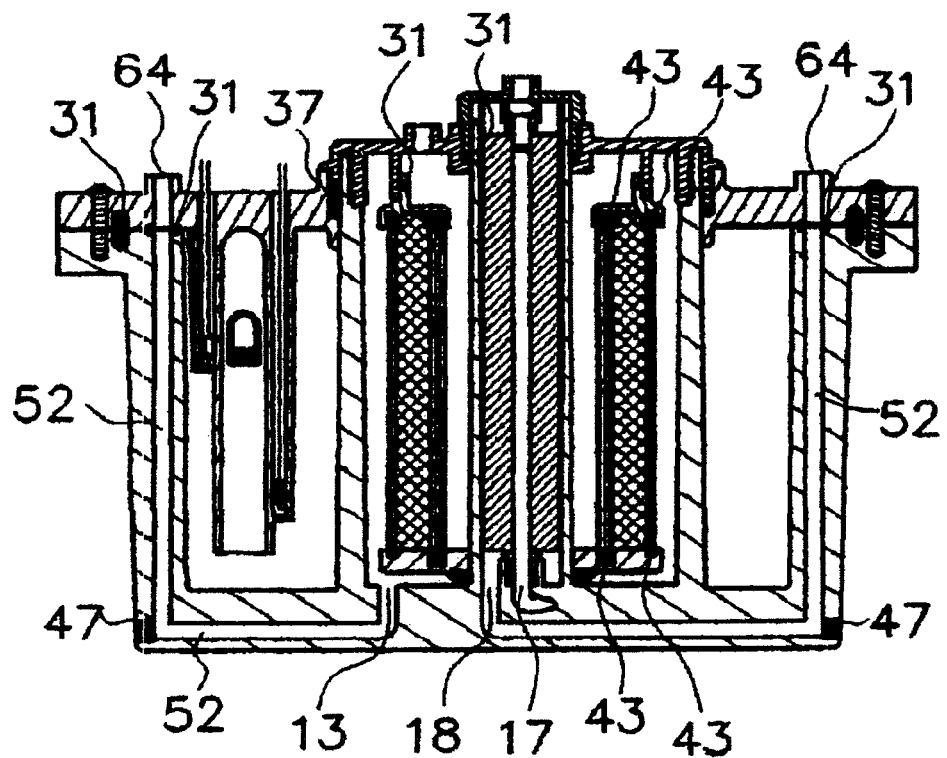
FIG. 22 is a sectional view of FIG. 15 along line D-D.
Figure 23:
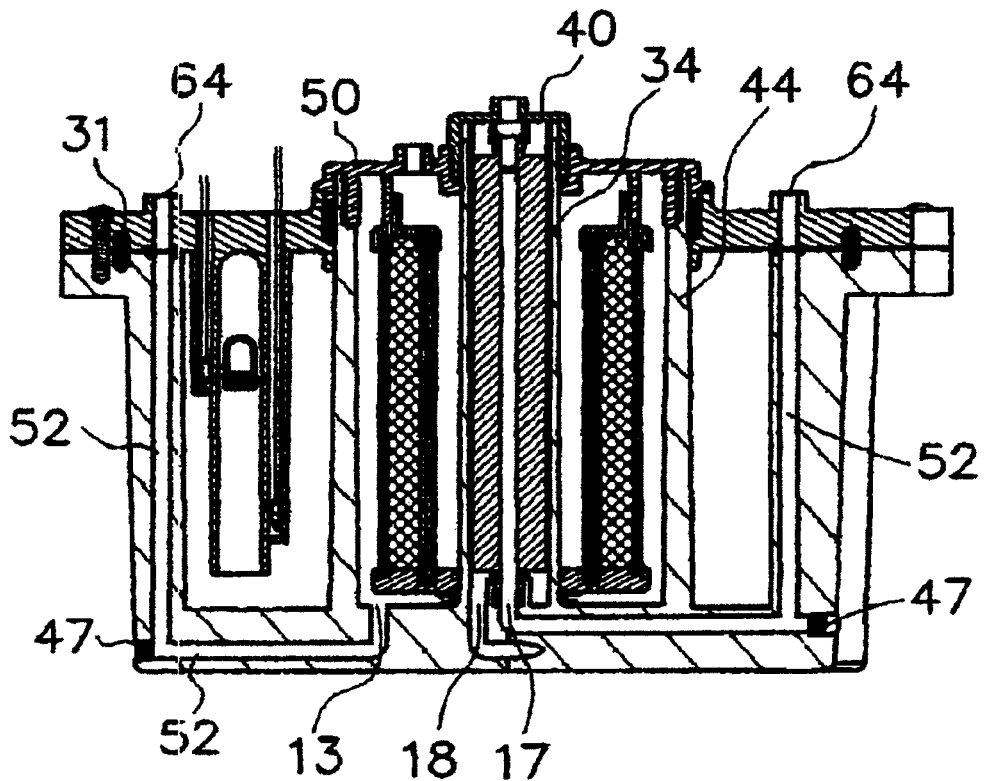
FIG. 23 is a sectional view of FIG. 15 along line E-E.
Figure 24:
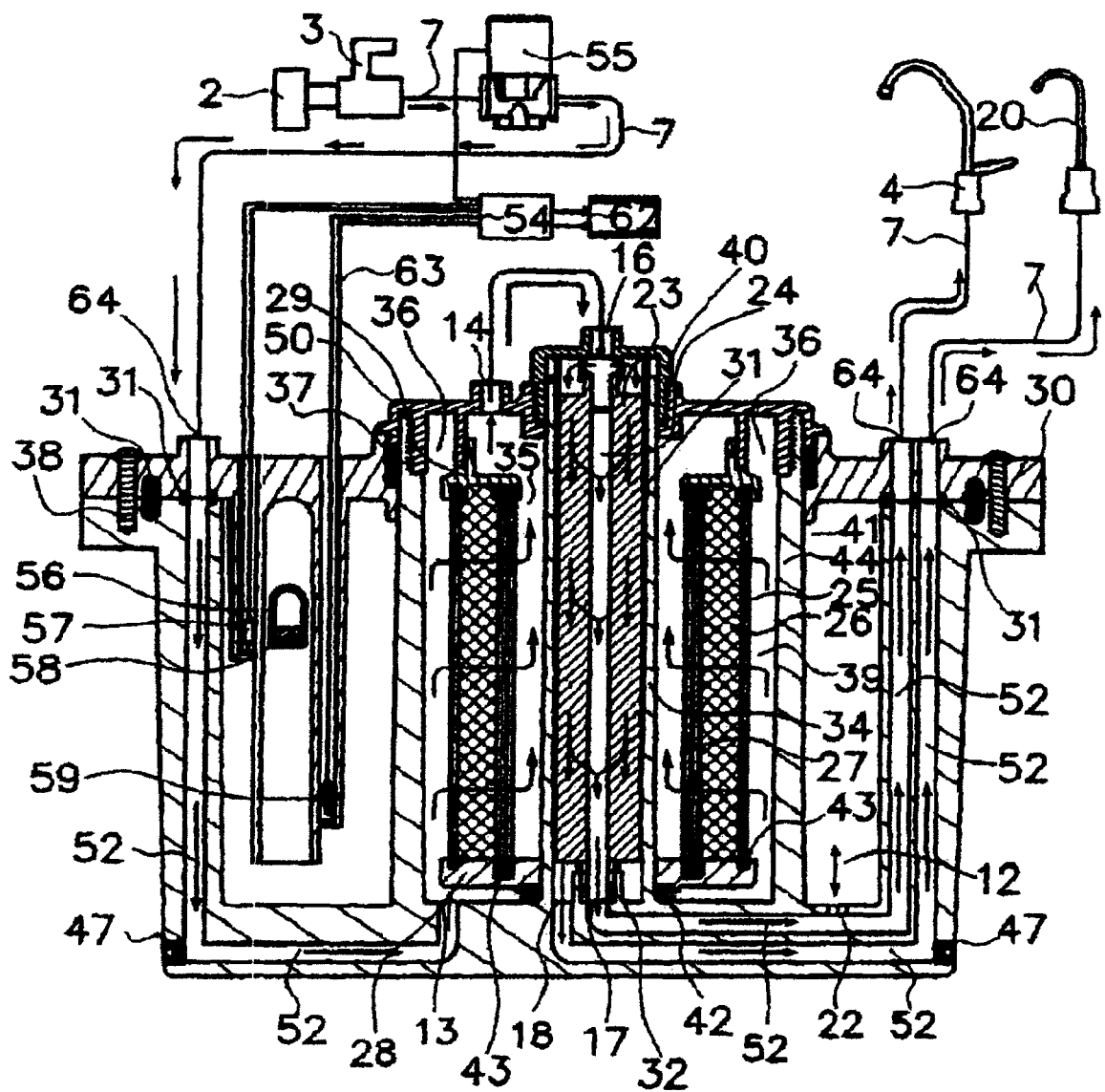
FIG. 24 is a illustrative figure composed by stacking FIG. 22 and FIG. 23 together.

FIG. 13 and FIG. 14 are schematic views of appearance of a water treatment equipment in accordance with a second embodiment of the invention. FIG. 15 is a front view. FIG. 16 is a back view. FIG. 17 is a top view. FIG. 18 is a bottom view. FIG. 19 is a right view. FIG. 20 is a left view. FIG. 21 is a sectional view of FIG. 15 along line C-C. FIG. 22 is a sectional view of FIG. 15 along line D-D. FIG. 23 is a sectional view of FIG. 15 along line E-E. FIG. 24 is a illustrative figure composed by stacking FIG. 22 and FIG. 23 together.

The flowing direction of water when producing purified water is illustrated with arrow referring in FIG. 24. This direction is same as that of the first embodiment: water supply pipe 2—manifold spigot 3—solenoid valve 55—water pipe 7—pipeline opening 64 provided on the body cover 30—water pipeline 52—water clarifier Inlet 13—water clarifier outlet 14—clarified water intake 16 of water purifier—purified water pipe 24 through membrane center. Purified water collected into purified water pipe 24 through membrane center either flows to water purifier outlet 17—water pipeline 52—outlet and inlet 22 of pressure reservoir and then stored into water reservoir 12, or flows to water pipeline 52—pipeline opening 64—water pipe 7—purified water outlet spigot 4. While RO membrane-cleaning water flows to membrane-cleaning water outlet 18—water pipeline 52—pipeline opening 64—water pipe 7—miscellaneous water outlet 20.

Embodiment 3

The third embodiment of this invention for integrating the clarifier and the purifier is described below referring to FIG. 25 to FIG. 34. The part of this equipment is omitted in this description.

Figure 25:
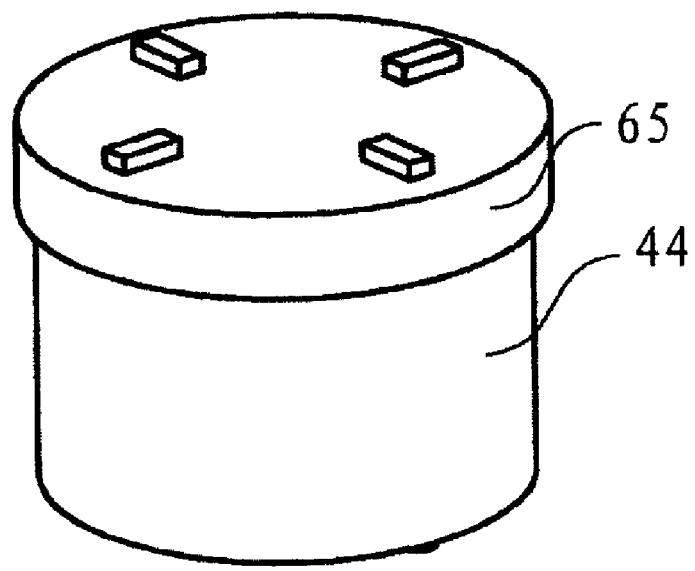
FIG. 25 is a schematic view of appearance of a water treatment equipment in accordance with a third embodiment of the invention.
Figure 26:
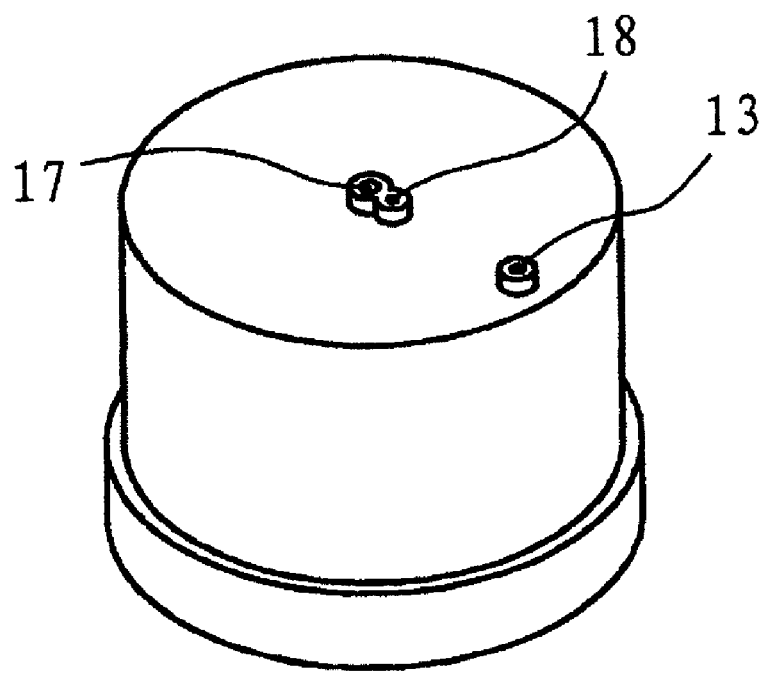
FIG. 26 is a schematic view of appearance of a water treatment equipment in accordance with a third embodiment of the invention.
Figure 27:
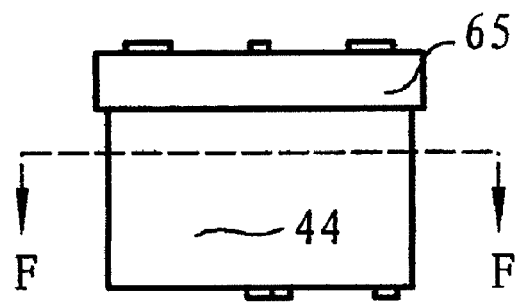
FIG. 27 is a front view of a water treatment equipment in accordance with a third embodiment of the invention.
Figure 28:
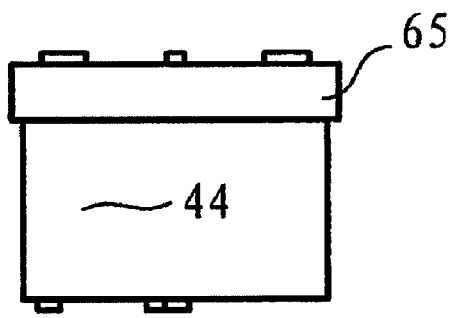
FIG. 28 is a back view of a water treatment equipment in accordance with a third embodiment of the invention.
Figure 29:
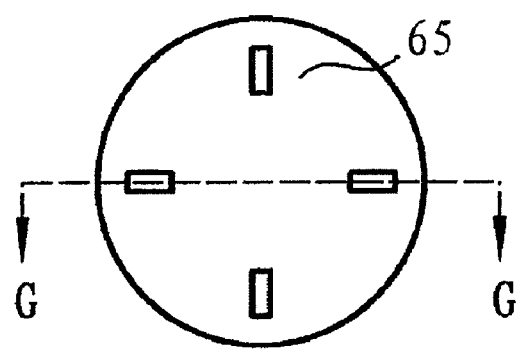
FIG. 29 is a top view of a water treatment equipment in accordance with a third embodiment of the invention.
Figure 30:
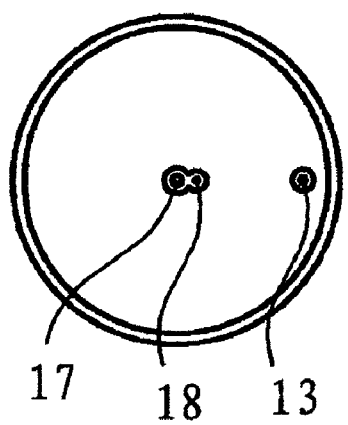
FIG. 30 is a bottom view of a water treatment equipment in accordance with a third embodiment of the invention.
Figure 31:
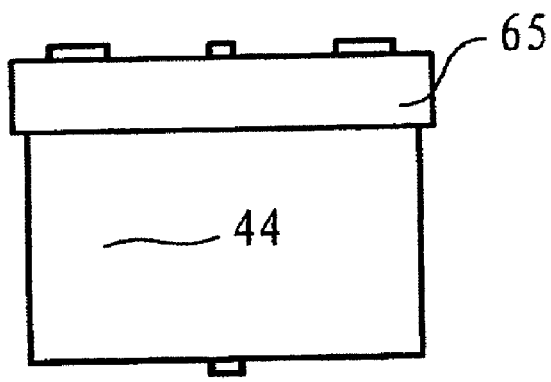
FIG. 31 is a right view of a water treatment equipment in accordance with a third embodiment of the invention.
Figure 32:
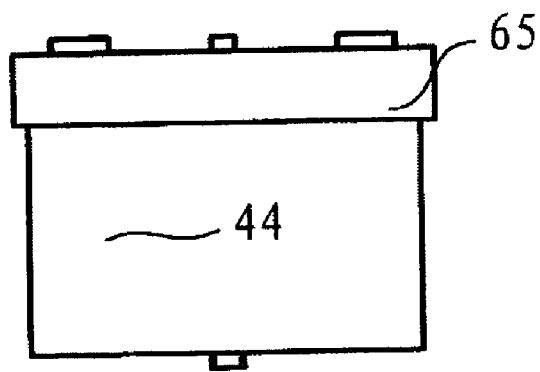
FIG. 32 is a left view of a water treatment equipment in accordance with a third embodiment of the invention.
Figure 33:
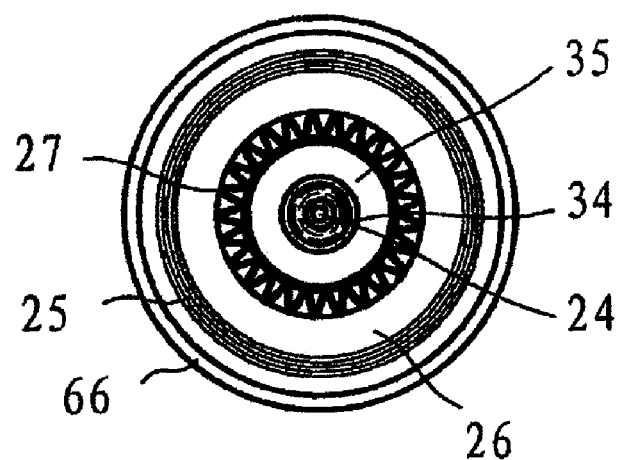
FIG. 33 is a sectional view of FIG. 27 along line F-F.
Figure 34:
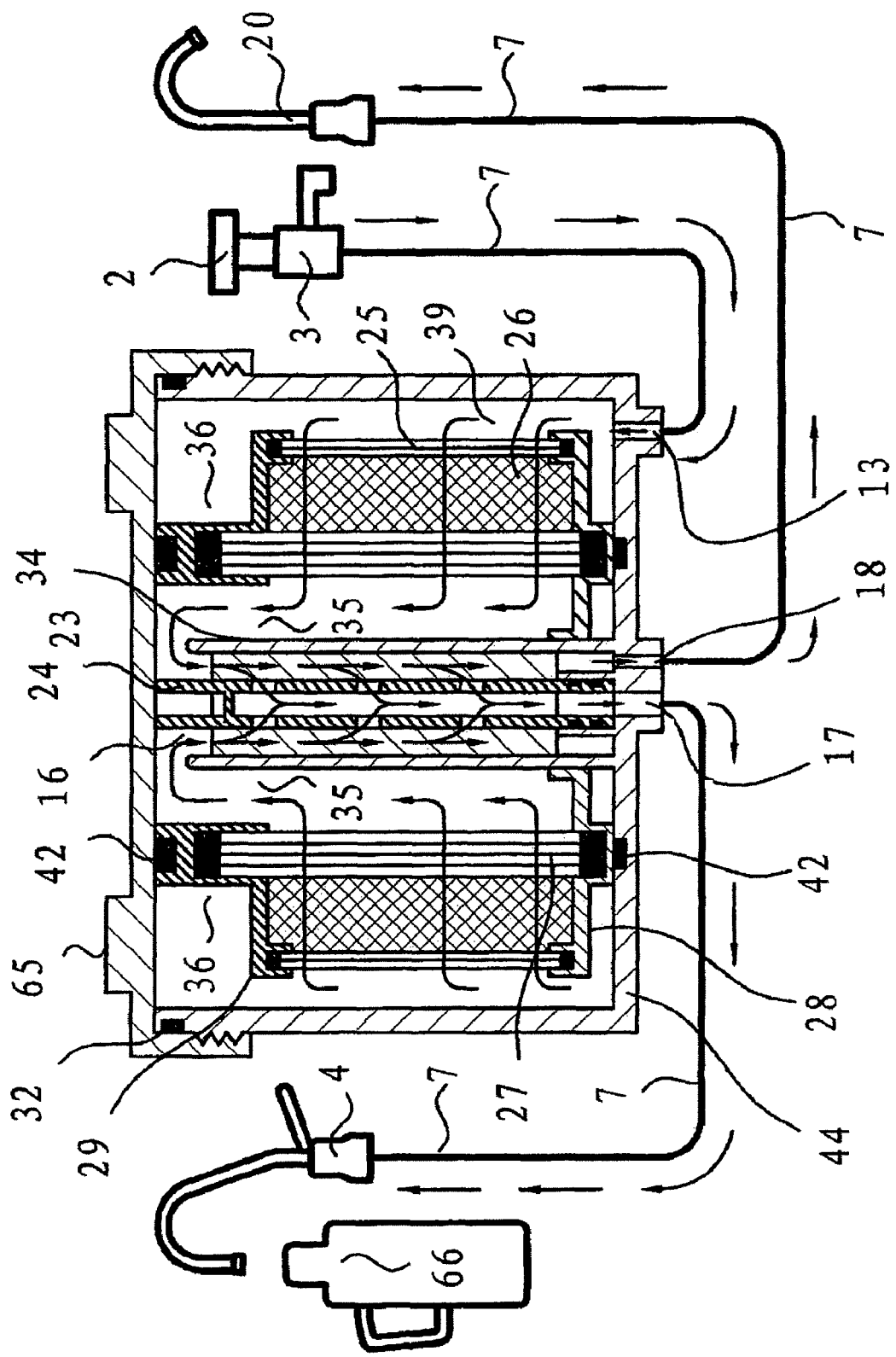
FIG. 34 is a sectional view of FIG. 29 along line G-G.

FIG. 25 and FIG. 26 are schematic views of appearance of a water treatment equipment in accordance with a third embodiment of the invention. FIG. 27 is a front view. FIG. 28 is a back view. FIG. 29 is a top view. FIG. 30 is a bottom view. FIG. 31 is a right view. FIG. 32 is a left view. FIG. 33 is a sectional view of FIG. 27 along line F-F. FIG. 34 is a sectional view of FIG. 29 along line G-G.

Water introduced from water supplying pipe 2 by manifold spigot 3 flows into raw water tank 39 from purified water inlet 13 through water pipe 7. Impurity and solid matter in water is filtered out by a preprocessing filter membrane 25 formed between cartridge base 28 and cartridge cap 29 by means of cross-flow filtering. Then, organic matter is absorbed and filtered by activated carbon layer 26. Solid matter above order of micron is then filtered by micron filter membrane 27. After that, water flows toward clarified water connecting section 35 and flows through the inner side of the sealing element 42 separating raw water tank 39 and the above-mentioned clarified water connecting section 35.

One part of purified water introduced from clarified water intake 16 of water purifier by water pipe 7 is filtered into purified water in RO membrane cartridge 23 of water purifier. Purified water is collected into purified water pipe 24 through membrane center and then dispensed from water purifier outlet 17. The other part cleans the surface of RO membrane. Membrane-cleaning water is discharged from membrane-cleaning water outlet 18 through water pipe 7 to miscellaneous water outlet 20.

Purified water dispensed from outlet 17 of water purifier, is dispensed from purified water outlet spigot 4 through water pipe 7, not using water reservoir but taking directly into a pot or bottle.

INDUSTRY APPLICABILITY

Focus on health and environment has been substantially increased. It is desirable for customers to obtain a water treatment equipment of this invention realizing compact disposing space, reduced material and costs.

What is claimed is:

1. A water treatment equipment is an equipment having a circular or box shape in which water introduced by water supply pipe (raw water) is firstly clarified and then purified, wherein:

at the bottom of water reservoir body with purified water outlet and inlet filling and draining purified water, a cylinder of water clarifier and a cylinder of water purifier are provided;

the cylinder of water clarifier has an inlet at the intake side of water clarifier, while within the cylinder of water clarifier the cylinder of water purifier has a purified water outlet and a membrane-clarified water outlet;

the water clarifier is cylindrical and its outer circumference is a preprocessing filter membrane for filtering sandstones and other impurities; its inner side is a cross-flow hollow collecting filter core composed of a micron filter membrane; and therebetween is a cartridge-type activated carbon layer;

a clarified water processing cartridge is mounted in the cylinder of water clarifier and a water outlet at the exit side of water clarifier is disposed on the top of the cylinder;

a water clarifier cap with space for a water purifier cap covers the cylinder of water clarifier with padding interposed so as to form a water clarifier;

a reverse osmosis (RO) membrane processing cartridge is mounted in the cylinder of water purifier;

a water purifier cap with a clarified water intake receiving clarified water covers the cylinder of water purifier with padding interposed so as to form a water purifier;

at the portion of the body excluding said water purifier and said water clarifier, a body cover is fixed and sealed by a fixed pin with padding interposed to form a water reservoir;

raw water is taken from water intake at water purifier inlet side utilizing water pipes such as hose, then is dispensed from water outlet at exit of water clarifier after clarification, and then is conveyed into the clarified water intake of the water purifier for receiving clarified water through a water pipe for purification in the water purifier;

purified water is dispensed from purified water outlet, and then conveyed into purified water outlet and inlet of water reservoir through a water pipe;

the water is stored in the pressure water reservoir with pressure of raw water, and air in the upper section of pressure water reservoir sustains the pressure;

when a purified water outlet spigot is opened, purified water is dispensed automatically with the sustained pressure;

membrane-cleaning water, which cleans the surface of RO membrane when producing purified water, is discharged from membrane-cleaning water outlet through a water pipe; and said water clarifier, said water purifier and said pressure water reservoir are formed integrally.

2. A water treatment equipment of claim 1, wherein water pipelines are provided at the bottom and in the wall of the pressure reservoir connecting clarified water outlet, membrane-cleaning water outlet, purified water outlet of the pressure reservoir, water clarifier inlet, outlets and inlets of said water pipelines are disposed on the body cover of the pressure reservoir, and said pipelines connect said outlets and inlets to the water pipes.

3. A water treatment equipment having a cylinder shape in which water introduced by water supply pipe (raw water) is firstly clarified and then purified, wherein:

a cylinder of water clarifier and a cylinder of water purifier are provided;

the cylinder of water clarifier has an inlet for taking in pure water, while within the cylinder of water clarifier the cylinder of water purifier or a component part of the cylinder of water purifier has a purified water outlet and a membrane-clarified water outlet;

a clarified water processing cartridge with a circular central hole is mounted in the cylinder of water clarifier;

a water clarifier and purifier cap covers the cylinder of water clarifier with padding interposed;

a reverse osmosis (RO) membrane processing cartridge is mounted in the cylinder of water purifier or a component part of the cylinder of water purifier;

an end of the cylinder of the water purifier is used as a clarified water intake for taking in clarified water;

raw water is taken from water intake at water purifier inlet side utilizing water pipes, clarified, then is conveyed into the clarified water intake of the water purifier for receiving clarified water, and then purified in the water purifier;

purified water is dispensed from purified water outlet and inlet;

membrane-cleaning water, which cleans the surface of RO membrane when producing purified water, is discharged from membrane-cleaning water outlet through a water pipe; and said water clarifier and said water purifier are formed integrally.

* * * * *